United States Patent [19]
Mahr et al.

[11] Patent Number: 5,606,156
[45] Date of Patent: Feb. 25, 1997

[54] STEERING COLUMN SWITCH FOR AUTOMOBILES

[75] Inventors: Herrmann Mahr, Waldalgesheim; Peter Kunz, Breitscheid, both of Germany

[73] Assignee: Eaton Corporation, Cleveland, Ohio

[21] Appl. No.: 386,585

[22] Filed: Feb. 10, 1995

[51] Int. Cl.$^6$ ........................................... H01H 9/00
[52] U.S. Cl. ................................. 200/61.54; 200/61.27; 200/295; 200/307
[58] Field of Search ............. 200/61.34, 61.35, 200/61.27, 61.54–61.57, 293–307

[56] References Cited

U.S. PATENT DOCUMENTS

| | | | |
|---|---|---|---|
| 3,209,092 | 9/1965 | Vitaloni et al. | 200/61.27 |
| 3,873,788 | 3/1975 | Machalitzky et al. | 200/61.27 |
| 3,892,932 | 7/1975 | Erdelitsch et al. | 200/61.27 |
| 4,277,658 | 7/1981 | Delp et al. | 200/61.54 |
| 4,327,264 | 4/1982 | Botz et al. | 200/295 |
| 4,404,438 | 9/1983 | Honjo | 200/61.54 |

FOREIGN PATENT DOCUMENTS

| | | | |
|---|---|---|---|
| 4305827 | 9/1994 | Germany | H01H 25/04 |
| 4339095 | 5/1995 | Germany | H01H 25/04 |
| WO94/19210 | 9/1994 | WIPO | B60Q 1/14 |
| WO95/13936 | 5/1995 | WIPO | B60Q 1/14 |

*Primary Examiner*—J. R. Scott
*Attorney, Agent, or Firm*—Roger A. Johnston

[57] ABSTRACT

An automotive steering column switch arranged on the end of a jacket (7) accommodating the steering column (8) and featuring several separate switches (12) consisting each of a casing (5, 15) with electrical connectors (13) and an actuating member (3, 16), at least one separate switch (2) can be slipped on the other separate switch (1) against the force of a spring (20) and with interaction of appropriate guiding means (19). The limit position of the separate switches (1, 2) relative to each other is fixed by a releasable clip connector (21).

12 Claims, 3 Drawing Sheets

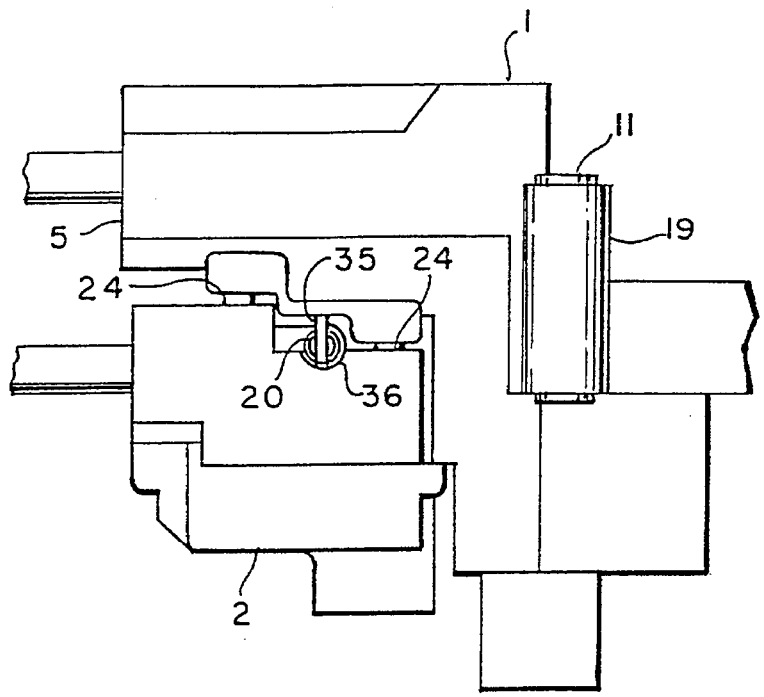
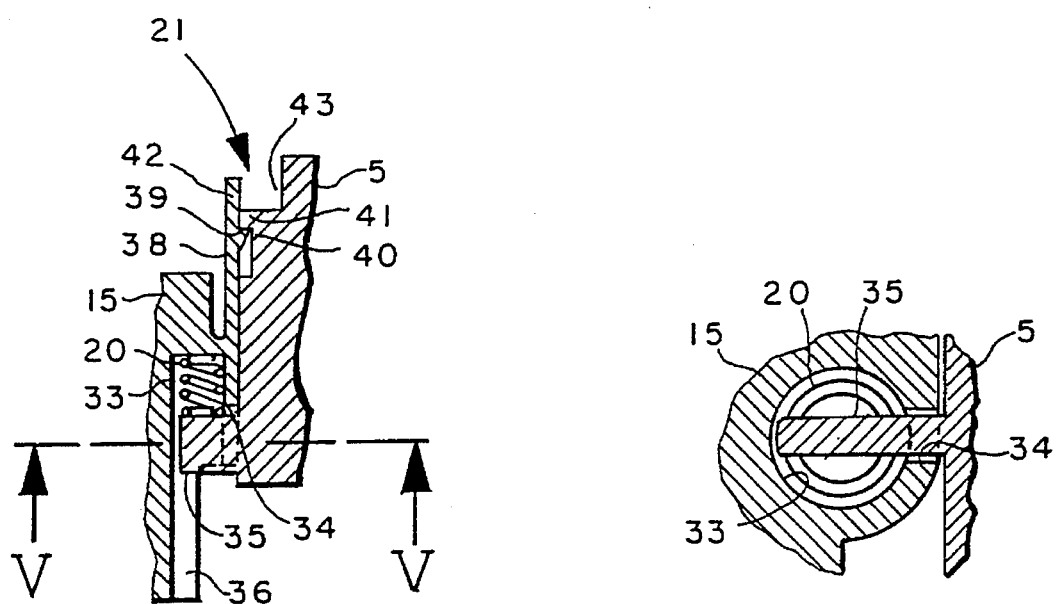
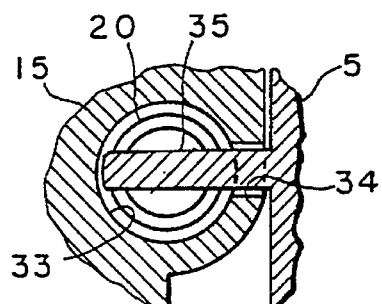

5,606,156

STEERING COLUMN SWITCH FOR AUTOMOBILES

BACKGROUND OF THE INVENTION

The invention relates to an automotive steering column switch which is arranged on the end of a jacket accommodating the steering column and features several separate switches, each consisting of a casing with electrical connectors and an actuating member or stalks.

On a steering column switch known from the not previously published DE 43 05 827 A1, all of the separate switches are mounted on a support plate. Through the intermediary of appropriate guiding means contained both on the support plate and the separate switch, each switch is slipped on the support plate and secured by a detachable clip. To mount several separate switches, the support plate must provide sufficient room to realize all of the guiding means and clip connectors. This applies both to mounting the separate switches on the periphery of the support plate as well as in the depth of the support plate, that is, in the direction in which the steering column extends. This requirement makes the support plate very large, which is reflected also in the tools and associated tool costs. Separate switches mounted successively on the support plate must leave sufficient space for assembly, thus enlarging the overall size once again. In view of stabilization, the support plate installed in the automobile is given a design such that a maximum configuration with separate switches will be possible. Therefore, a large support plate is always installed, which requires much space, even with unoccupied guiding means and which contradicts efforts toward weight reduction.

The problem underlying the invention is to provide a steering column switch of the initially named type on which separate switches can be joined to one another quickly, easily and without backlash, and released again, without needing a tool and without modifying the support plate.

SUMMARY OF THE INVENTION

The above-described problem is inventionally solved in that at least one separate switch nests on another separate switch against the force of a spring and with the interaction of appropriate guiding means and is secured in its limit position by a detachable clip connector.

According to an aspect of the invention, the one separate switch is mounted as a base switch on the end of the steering column jacket and the other separate switch, configured as a slip-on switch, is slipped on the casing of the base switch. Thus, the base switch occupies space on the steering column jacket, or on its support plate, and is secured there. No additional space or additional guiding means are required for the slip-on switch on the support plate, making it possible to keep the support plate small and the number of support plates low.

Moreover, preference is given to providing on the slip-on switch at least one tongue type slider which engages a slot in the base switch. Integrating the slot in the base switch is preferable inasmuch as there are no protruding form elements present behind which electrical lines or other elements used on the steering column might catch.

To avoid catching of electrical lines and to establish the guidance in a more innovative way, another embodiment of the invention provides for arranging two tongue type sliders of the slip-on switch on webs on the casing of the slip-on switch, said webs having approximately the same length as the casing of the base switch and bearing by way of straps on the casing.

In another aspect of the invention, each tongue type slider of the slip-on switch is T-shaped, with the surface located between the web and the head of the tongue type slider being skewed. Furthermore, the slot in the base switch consists suitably of walls molded perpendicularly to the casing and one, each angle extending perpendicularly to the wall, the angles being in alignment with one another, the inside surface between wall and angle being skew, and the wall and angle joined at one end of the slot. This design of the matching form elements assures a good entry of force in the casing, an accurate tolerance of fit, and prevents an incorrect insertion of the form elements.

To obtain a clip connection free of backlash, another aspect provides for fitting the spring, fashioned as a helical spring, in a manner secured against loosening in a blind hole in the slip-on switch casing.

According to a further aspect of the invention, the wall of the blind hole has a slot that extends axially in relation to the blind hole, This makes it possible to keep the helical spring abutment short.

According to a further aspect of the invention, the abutment is formed by arranging on the casing of the base switch a stub projection which in establishing the clip connection plunges into the slot of the blind hole in the slip-on switch casing and compresses the spring.

According to another embodiment of the invention, the clip connector features an elastic arm with a nose which snaps in place behind a shoulder of a clip web. To enable a low-cost manufacture of the clip elements and a manual release of the clip connector, the elastic clip arm of the clip connector is according to another aspect of the invention arranged on the slip-on switch casing and the clip web with the shoulder of the base switch, with the elastic clip arm—which protrudes beyond the shoulder of the web into a free space—featuring a release lever.

The idea underlying the invention will be more fully explained hereafter in the following description with the aid of an embodiment illustrated in the drawings.

BRIEF DESCRIPTION OF THE DRAWINGS

FIG. 3 a view of the steering column switch according to FIG. 1 in the direction of arrow III;

FIG. 4 a partial section according to FIG. 2, in the direction of arrows IV—IV;

FIG. 5 an enlarged section through FIG. 4 in the direction of arrows V—V;

DETAILED DESCRIPTION

Figure 1:
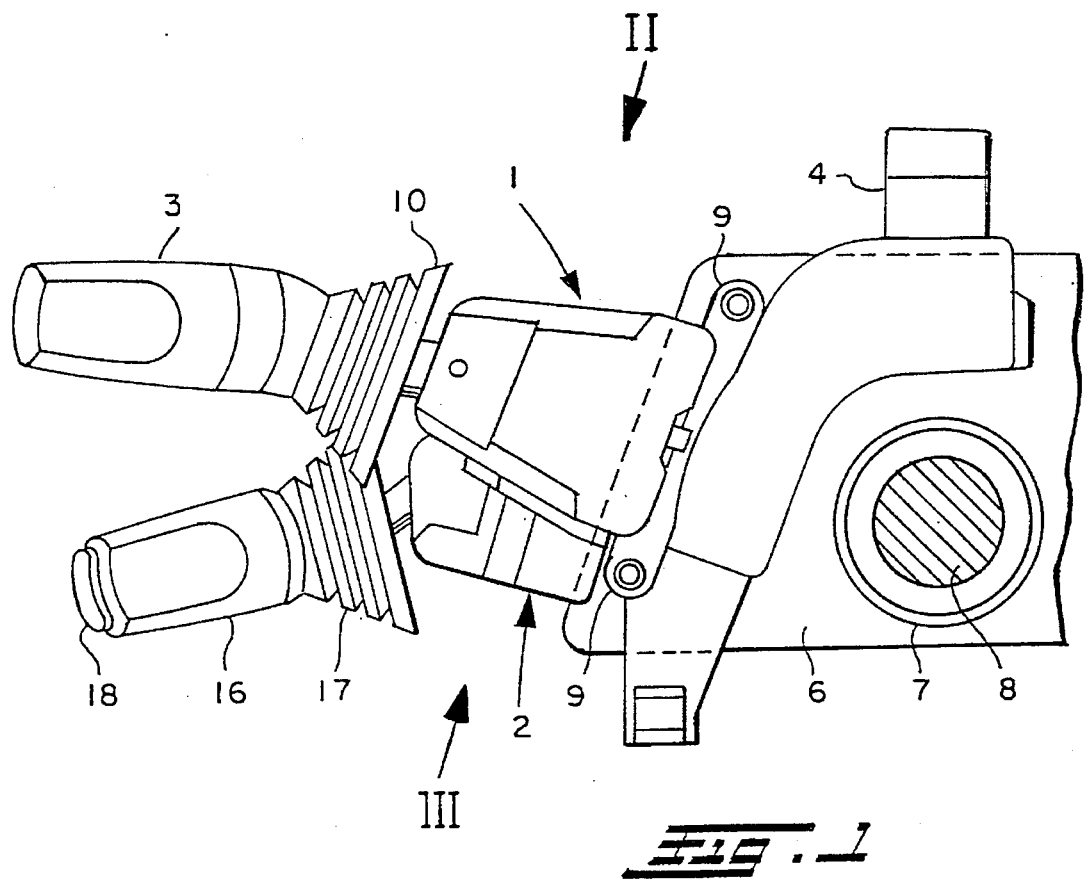
FIG. 1 shows a plan view of a steering column switch with jacket, steering column and support plate.

The steering column switch is comprised of two separate switches, a base switch 1 and a slip-on switch 2, the base switch 1 featuring an actuating lever 3 and a push button 4. The casing 5 of base switch 1 is angular and situated over a support plate 6 attached to the steering column jacket 7, in which the steering column 8 is fixed. The base switch 1 attaches to the support plate 6 by means of screw-down eyelets 9. Actuating lever 3 of base switch 1 is fitted with an elastic boot 10 covering the entrance opening of the actuating lever 3 in the casing 5 of the base switch 1. Fitted in the screw-down eyelets 9 of casing 5 are sleeves 11 whose length is greater than that of the screw-down eyelets 9. Molded to the side of casing 5 of base switch 1, opposite the actuating lever 3, is a surrounding collar 12 which protects the electrical connectors 13.

Figure 2:
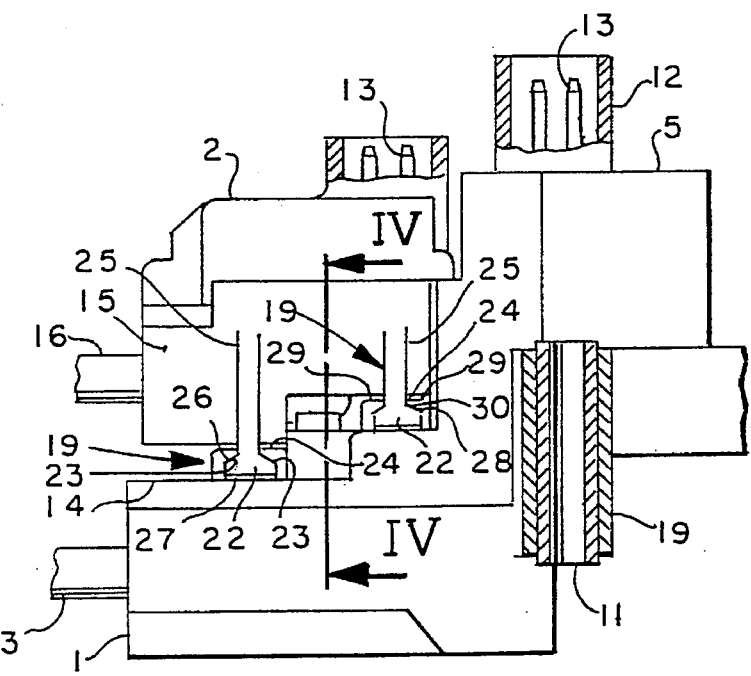
FIG. 2 a view of the steering column switch according to FIG. 1 in the direction of arrow II with partial sections.
Figure 6:
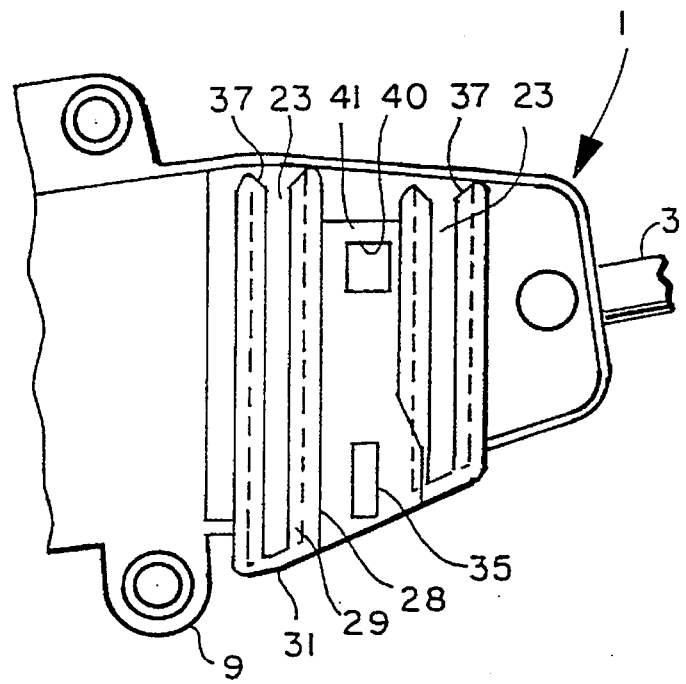
FIG. 6 a view on the base switch, the viewing direction being on the connector elements.
Figure 7:
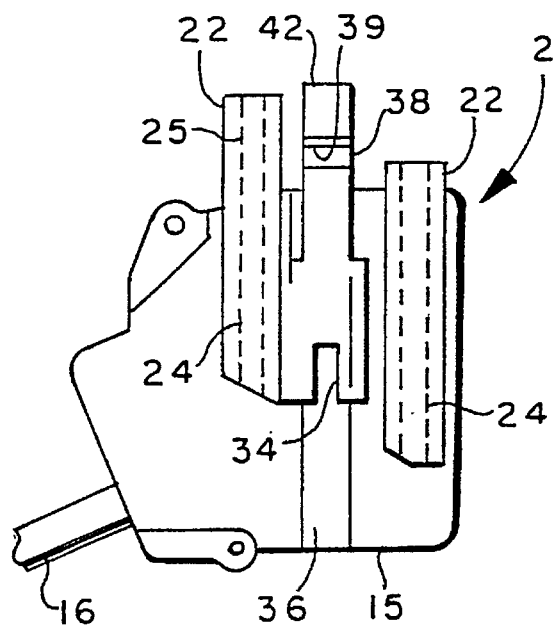
FIG. 7 a view on the slip-on switch, the viewing direction being on the connector elements.

Referring to FIG. 2, the back 14 of casing 5 is fashioned stepped. The casing 15 of slip-on switch 2 adapts in its shape to the stepped area of the back 14 of casing 5. Slip-on switch 2 features additionally an actuating member organ 16 with pertaining boot 17. In its front area, actuating member organ 16 is provided with another push button 18. Base switch 1 and slip-on switch 2 are separate switches which through the interaction of appropriate guiding means 19 can be slipped on another against the force of a spring 20. The limit position is fixed by a releasable clip connector 21.

The separate switch serving as base switch 1 is attached to the end of the steering column jacket 7. The separate switch designed as slip-on switch 2 slips on casing 5 of base switch 1. Provided on slip-on switch 2 is at least one tongue type slider 22 engaging a slot 23 in the base switch 1.

Provided on the casing 15 of the slip-on switch are webs 24 supporting the tongue type sliders 22. The latter have about the same length as the casing 5 of base switch 1. The protruding area of slider 22 bears with straps 25 on the casing 15 of slip-on switch 2. Each slider 22 of slip-on switch 2 is T-shaped. The area 26 between web 24 and head 27 of the T-slider is beveled. Each slot 23 in the base switch 1 consists of walls 28 molded perpendicularly to the casing 5 and one angle 29 each extending perpendicularly to the wall 28. Angles 29 are in mutual alignment. The inside surface 30 contained between wall 28 and angle 29 is in its skew adapted to the extension of surface 26 of T-slider 22. The wall 28 and angle 29 are joined at the end 31 of slot 23.

Between casing 5 of base switch 1 and casing 15 of slip-on switch 2, the spring 20—fashioned as helical spring—is fitted in non-loosenable fashion in a blind hole 33 in the casing 15 of slip-on switch 2. Spring 20 is secured against loss by a spider type nipple at the bottom of blind hole 33 or by wedge-shaped points on the periphery of blind hole 33, which are not illustrated. Blind hole 33 has in its wall toward the casing of base switch 1 a slot 34 that extends axially relative to blind hole 33. A stub projection 35 is arranged on the casing 5 of base switch 1. In the assembly of clip connector 21, said stub projection 35 engages slot 34 in the blind hole 33 in casing 15 of the slip-on switch 2 and compresses the spring 20. In fitting the spring 20 in the blind hole 33, a half shell 36 (a semi-cylindrical groove formed) is inserted, in casing 15 of slip-on switch 2. Groove 36 extends into blind hole 33. Stated in another way, a portion of the wall of blind hole 33 is extended as groove 36. The ends of T-slider 22 and slot 23 have matching bevels, and approach bevels 37 are provided on the slot 23 to facilitate insertion of the guiding means 19.

The clip connector 21 is comprised of an elastic clip arm 38 with pertaining clip nose 39 which snaps in place behind a shoulder 40 of a web 41. Contained on casing 15 of slip-on switch 2 is the elastic slip arm 38 for the clip connector 21. Arranged on casing 5 of base switch 1 is the clip web 41 with shoulder 40. In nesting the guiding means 19, projection 35 engages the slot 34 and pushes the spring 20 together. The elastic clip arm 38 slides at the same time along casing 5 of base switch 1, yields to the casing 5 of base switch 1 and snaps in place behind shoulder 40 with its nose 39. The elastic clip arm 38 features a release lever 42, which protrudes beyond the shoulder 40 of web 41 into a space 43. To release the clip connector 21, elastic clip arm 38 is moved by its release lever 42 toward slip-on switch 2. Nose 39 separates from shoulder 40, the spring 20 spreads the base switch 1 and slip-on switch 2 in the guiding means 19 apart to an extent such that the clip connector 21 is released. To reestablish clip connection 21, base switch 1 and slip-on switch 2 are squeezed together.

Although the present invention has been described hereinabove with respect to the illustrated embodiments, it will be understood that the invention is capable of modification and variation and is limited only by the scope of the following claims.

We claim:

1. An automotive steering column switch arranged on the end of a jacket accommodating the steering column and featuring several separate switches consisting each of a casing with electrical connectors and an actuating member, characterized in that a first switch is slipped on the column jacket and a second separate switch slipped on the first switch against the force of a spring (20) with the interaction of appropriate guiding means (19) and is fixed in its limit position by a releasable clip connector (21).

2. The steering column switch according to claim 1, characterized in that said first switch is mounted on the end of the steering column jacket, as a base switch (21), and the second separate switch is slipped on the casing (5) of the base switch (1) as a slip-on switch.

3. The steering column switch according to claim 1, characterized in that the second switch (2) has at least one tongue type slider (22) engaging a slot (23) in the base switch (1).

4. The steering column switch according to claim 1, characterized in that said second switch has webs (24) on the casing (15) and there are two tongue type sliders (22) of the second switch (2) arranged to have about the same length as the casing (5) of the base switch (1) and bear by way of straps (25) on the casing (15).

5. The steering column switch according to claim 1, characterized in that the second switch (2) has a tongue type slider which is T-shaped, the surface (26) between the web (24) and the head (27) of the tongue type slider (22) being skewed.

6. The steering column switch according to claim 1, characterized in that the first switch (1) has a slot with walls (28) molded perpendicularly to the casing (5) and one each angle (29) extending perpendicularly to the wall (28), the angles (29) being in mutual alignment, the inside surface (30) between wall (28) and angle (29) extending obliquely, and the wall (28) and angle (29) being joined at one end (31) of the slot (23).

7. The steering column switch according to claim 1, characterized in that the spring (20) fashioned as a helical spring is secured against loosening in a blind hole (33) in the casing (15) of the slip-on switch (2).

8. The steering column switch according to claim 7, characterized in that a wall of the blind hole (33) features a slot (34) that extends axially in relation to the blind hole (33).

9. The steering column switch according to claim 1, characterized in that on the casing (5) of the first switch (1) there is arranged a stub projection (35) which in establishing the clip connection (21) engages a slot (34) in a blind hole

(33) in the casing (15) of the second switch (2), compressing the spring (20).

10. The steering column switch according to claim 1, characterized in that the clip connector (21) features an elastic arm (38) with a nose (39) that snaps in place behind a shoulder (40) of a web (41).

11. The steering column switch according to claim 1, characterized in that the elastic clip arm (38) of the clip connector (21) is arranged on the casing (15) of the second switch (2), and the clip web (41) with the shoulder (40) on the casing (5) of the first switch (1), the elastic clip arm (38) featuring a release lever (42) which protrudes beyond the shoulder (40) of the clip web (41) and into a space (43).

12. An automotive steering column switching assembly of the type disposed on the steering column jacket and stalk actuated by the user comprising:

(a) a first switch having a casing, an electrical connector, and an actuating stalk with the casing attached to the steering column jacket; and, (b) a second switch having a separate casing, electrical connector and actuating stalk, said second switch having the casing thereof slidably attached to the casing of said first switch and biased to a limit position thereon.

* * * * *